United States Patent [19]

Foster

[11] 3,920,859
[45] Nov. 18, 1975

[54] METHOD FOR RECONSTITUTING FROZEN FOOD

[76] Inventor: Lawrence H. Foster, 11 Ogden Road, Scarsdale, N.Y.

[22] Filed: Mar. 25, 1974

[21] Appl. No.: 454,777

[52] U.S. Cl. .................. 426/520; 426/524; 34/191; 34/196
[51] Int. Cl.² ...................... A23C 3/00; F26B 21/06
[58] Field of Search ........ 34/191, 196, 225; 432/18, 432/5, 9, 31; 312/236; 99/468, 481, 470, 474, 475, 476; 426/524, 520

[56] References Cited
UNITED STATES PATENTS

| | | | |
|---|---|---|---|
| 1,499,627 | 7/1924 | Thelen | 34/191 |
| 1,774,208 | 8/1930 | Mueller | 34/191 |
| 1,955,374 | 4/1934 | Cobb et al. | 34/191 |
| 2,281,625 | 5/1942 | Skinner | 99/476 |
| 2,347,601 | 4/1944 | Jackson | 34/191 |
| 2,419,119 | 4/1947 | Christensen | 99/476 |
| 3,131,034 | 4/1964 | Marsh | 34/191 |
| 3,261,650 | 7/1966 | Stromquist | 34/196 |
| 3,309,788 | 3/1967 | Knipschild | 34/191 |
| 3,659,352 | 5/1972 | Cook | 34/191 |
| 3,682,643 | 8/1972 | Foster | 426/524 |

FOREIGN PATENTS OR APPLICATIONS

| | | | |
|---|---|---|---|
| 884,654 | 5/1943 | France | 34/191 |

Primary Examiner—John J. Camby
Assistant Examiner—Henry C. Yuen
Attorney, Agent, or Firm—Pasquale A. Razzano; Harold L. Stults

[57] ABSTRACT

A method of reconstituting food from a frozen state to a ready-to-serve state in which heat is delivered to the food at an average rate which is in excess of the rate at which heat would pass into the food. The heat is delivered to the food by supplying heated air thereto at a controlled temperature and in a pre-determined direction, with the direction of air flow being periodically reversed at predetermined intervals.

8 Claims, 3 Drawing Figures

METHOD FOR RECONSTITUTING FROZEN FOOD

The present invention relates to a method for reconstituting food and, more particularly, to a method of reconstituting previously cooked food from a fully frozen state to a ready-to-serve state in one continuous operation.

At large food facilities such as, for example, banquet halls, schools, cafeterias, restaurants, and the like, there is an inherent demand for the preparation of large quantities of food for immediate consumption at approximately the same time. Attendant with this demand is the problem of preparing such food for rapid service while simultaneously maintaining its desirable characteristics of taste, texture, and nutrition. Since conventional cooking ovens generally cannot meet this demand, particularly where a large variety of dishes are necessary, numerous establishments are turning to the use of frozen food products which have been previously prepared. Such products typically are initially cooked and flash-frozen so as to retain the desired qualities of taste, texture, and nutrition and thereafter are thawed under controlled conditions so as not to impair these qualities. Such controlled thawing operations typically include provision for bringing the frozen food from its stored state to a temperature at which it is ready to serve, and this process is generally known as reconstituting frozen food.

It is an object of the present invention to provide an improved method of reconstituting pre-cooked frozen food.

Yet another object of the present invention is to provide a reconstituting method which is relatively simple in operating.

Another object of the present invention is to provide a method of reconstituting cooked frozen food to its ready-to-serve state rapidly and efficiently in a manner by which one is able to sustain high volume production in mass food service facilities.

Yet another object of the present invention is to provide a method of reconstituting frozen food which is efficient and dependable in operation.

The above, and other objects features, and advantages of this invention will be apparent in the following detailed description of an illustrative embodiment thereof which is to be read in connection with the accompanying drawings, wherein.

Figure 1:
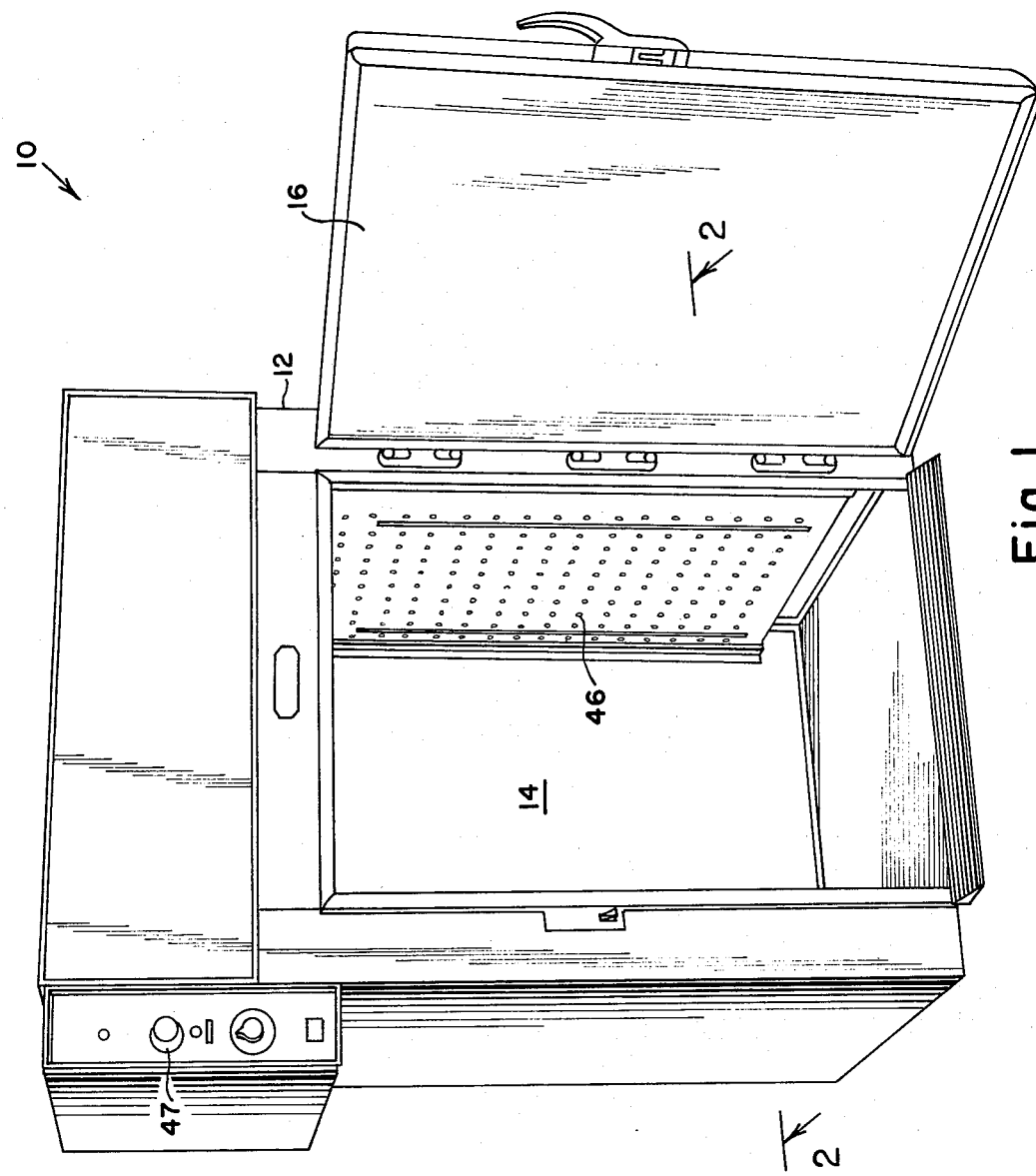
FIG. 1 is a perspective view of a reconstituting oven constructed to perform the method of the present invention.
Figure 3:
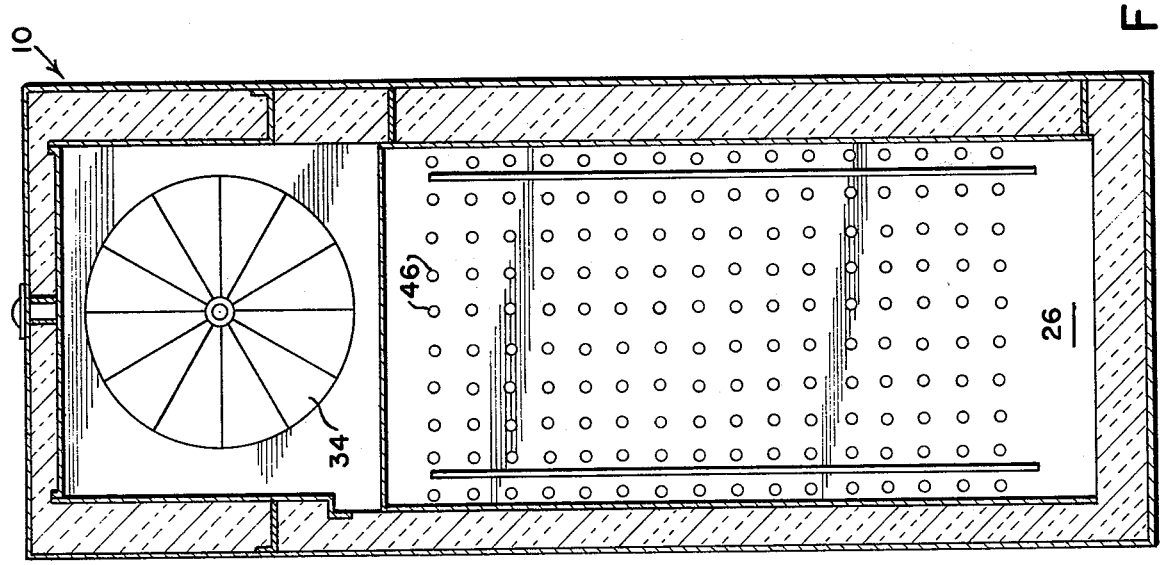
FIG. 3 is a sectional view taken along lines 3—3 of FIG. 2.

Referring now to the drawing in detail and, initially to FIG. 1 thereof, it will be seen that an oven 10, adapted to perform the method of the present invention, includes an insulated housing 12 having a heating cavity provided therein to which access is obtained through a conventional pivoted door 16. The frozen food to be reconstituted by the present invention is placed in cavity 14 in any convenient manner, preferably on a cart or rack 18 (shown in dotted lines in FIG. 2) with the containers of pre-cooked frozen food located on the rack in slightly spaced relation to one another to provide air passages horizontally therebetween. The rack, having evenly spaced shelves thereon provides uniform horizontal air flow passages between the food containers thereon.

The food in cavity 14 is subjected to heating by a supply of heated air introduced into the cavity in a predetermined direction, with the direction of the air being periodically reversed in the manner described hereinafter. The temperature of the air is carefully controlled so that, in conjunction with the periodic reversal of the air flow, heat is distributed evenly throughout the oven cavity to insure that all of the frozen food therein is uniformly heated.

Cavity 14 in oven 10 is defined between top and bottom walls 20, 22 and a pair of perforated side walls 24, 26 respectively. The side walls are removably mounted in oven 10 in any convenient manner and are located adjacent air supply chambers 28, 30 formed in the side walls of the oven. These air supply chambers are in communication with a plenum chamber 32 in the upper portion of oven 10. A high volume blower or fan 34 driven by a motor 36 in either of two directions, is located in chamber 32 and serves to circulate air through the air supply chambers 28, 30 and cavity 14.

The air within plenum chamber 32 and cavity 14 is selectively heated by a plurality of elongated high wattage electrical heating elements 38 mounted adjacent the upper end portions of air supply chambers 28, 30. These heaters may consist of a central electrical heating rod 40, having a plurality of vanes 42 extending therefrom. The air flowing from plenum chamber 32 over heating vanes 42 is thus heated prior to supply through chambers 28, 30 to cavity 14.

Heaters 38 are controlled by an electronic circuit of conventional construction, which need not be described here in detail, to maintain the temperature within chamber 14 at a relatively uniform level within a pre-determined range. The control circuit for the heaters can be operated by controls 44, 47 on the front panel of the oven to set a desired pre-determined temperature and time of operation for the oven. Typically the temperature level selected is one which provides heat at a rate which is greater than the rate at which the food being reconstituted can accept heat.

The electronic controls for heaters 38, will allow the heaters to attain the selected temperature, shut off the heaters when that temperature is achieved, and then turn the heaters back on when the air temperature has dropped a predetermined amount, e.g. 25°, whereupon the heaters again raise the air temperature to the selected level. In this manner, the heaters cycle to control the air temperature within a 25° temperature range having its upper limit at the selected temperature. This cyclical heater operation will continue for the pre-set time cycle, selected in order to properly reconstitute the frozen food.

The timing cycle for the electronic control 44 includes a periodic control for drive motor 36 which will cause the motor to periodically reverse the direction of rotation of fan 34. It has been found that in the preferred embodiment of the present invention, the periodic reversal of motor 36 should occur every three to seven and one-half minutes, and preferably every five minutes. In this manner, it will be seen that the air flow within oven 10 will be in the direction of the arrows A or B in FIG. 2, depending upon the direction of rotation of fan 34.

Figure 2:
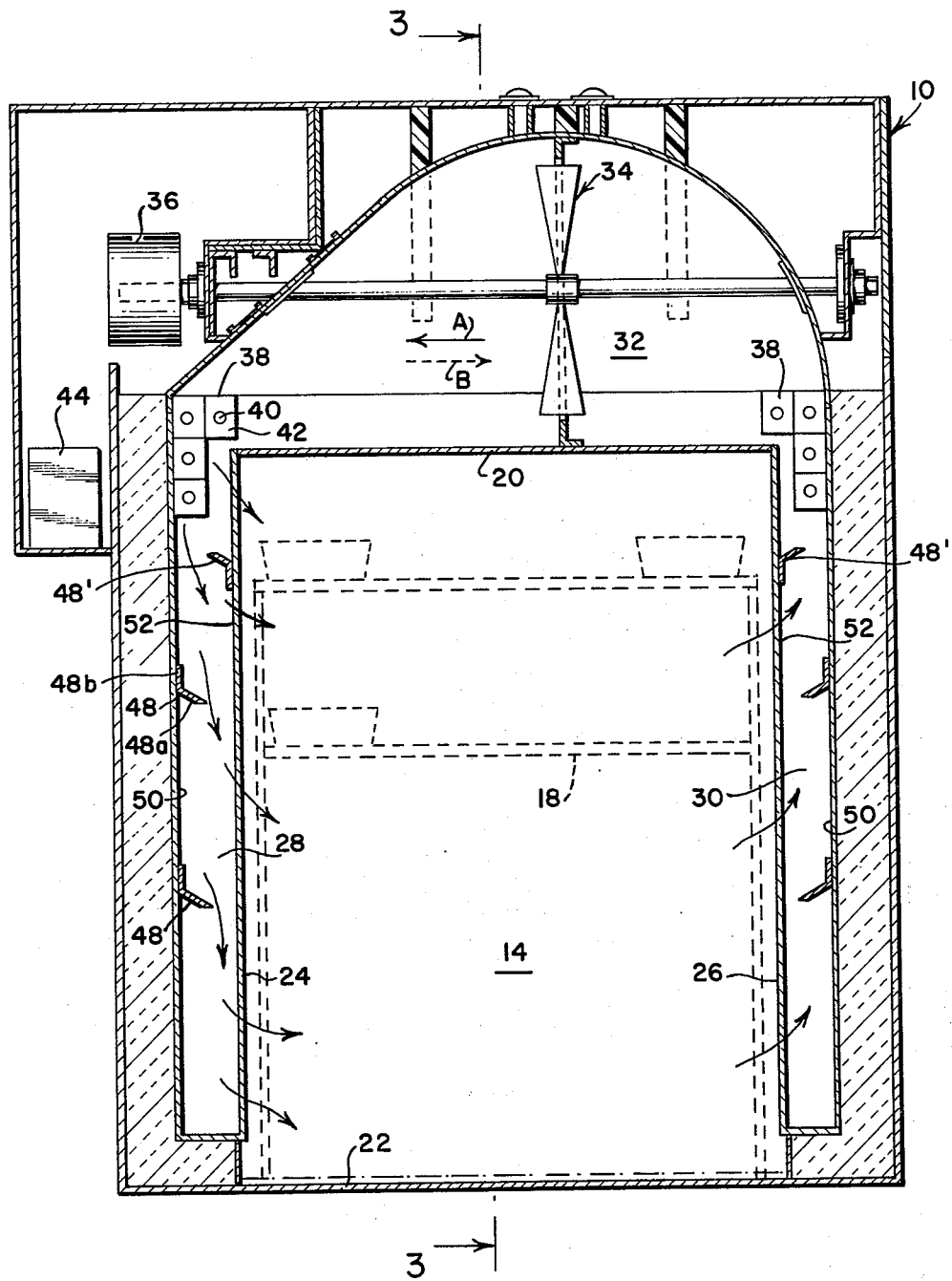
FIG. 2 is an elevational view, in section, taken along lines 2—2 of FIG. 1.

When air is flowing in the direction of the arrow A, it will first encounter heaters 38 at the left of the oven in FIG. 2, and be directed through air supply chamber 28 and the perforations or apertures 46 in side wall 24 into cavity 14. The air will flow laterally across cavity 14 and over the food products on rack 18 towards the right and thence through apertures 46 in side wall 26. This air, which has cooled somewhat due to its encounter with the colder food products, enters air supply chamber 30 and rises upwardly therein under the influence of the fan 34. The air thence encounters the heaters 38 at the upper right hand corner of the oven, as seen in FIG. 2, and is impelled through fan 34 in the direction of the arrow A. After the pre-determined time period of operation of motor 36 and fan 34 in the direction which forces air to flow in the direction A, the direction of drive of motor 36 is reversed so that air moves in the direction B in the next cycle of operation. In this connection it is noted that preferably the electronic time control for the motor 36 has a delay of 3 seconds built in through its control so that the drive of the motor from one direction to another is delayed in order to avoid damage to the motor by an initial shock in the reversal of direction.

Uniform control of the air distribution into chamber 14, in either direction of flow, is achieved by the provision of a plurality of baffles 48 mounted on the side walls 50 of the respective air chambers 28, 30 and on the inner surfaces 52 of the panels 24 and 26, as seen in FIG. 2. These deflecting baffles preferably extend along the entire width of the panels 24, 26 and have a generally flange-shaped configuration, with the bent portions 48a thereof extending at an angle of approximately 55° from the plane of its unbent or flat side 48b. The baffles peel off downwardly flowing air in the respective chambers and direct the air horizontally in layers through the thin passageways between the food products on shelves of rack 18.

It is noted that baffles 48 on panels 24, 26 are positioned in an opposite direction from the baffles 48 on the side walls 50. These baffles serve to peel off a portion of the air to direct it to the top portions of chamber 14. However, these baffles preferably are provided with a plurality of apertures or holes in their bent flange 48a, so as to allow air flow into the lower portions of supply ducts 28, 30. Preferably, these holes are in alignment with the holes 46 in the third row of holes from the top of each of the panels, to properly direct a portion of the air flow to the top portion of the chamber, thereby allowing an even air deflection resulting in a substantially uniform temperature distribution within the chamber 14 from the top to the bottom thereof.

By the provision of a uniform distribution of the heated air within chamber 14, and the periodic reversal of the heated air flow within the chamber, uniform impulse heating of the food on the trays within the chamber is achieved. The air flow through the chamber is at a relatively high speed, so that the heated air sweeps over the food to uniformly heat the same. The food closer to the inlet side of the chamber during a particular cycle of operation will be heated more rapidly than food adjacent the outlet side of the chamber due to the fact that the air flows initially from ports 46 in a jetlike manner in a substantially laminar flow. The sweeping movement of the laminar flowing air and the rapid velocity thereof provides a higher heat transfer to the food adjacent the inlet side of the chamber. As the air progresses along the chamber, for example from left to right in FIG. 2, the air becomes more turbulent and loses its velocity. The turbulent air provides less heat transfer to the food product at the right of the chamber so that food does not absorb heat from the air as rapidly as the food adjacent the inlet side of the chamber. Moreover, the air temperature will be reduced somewhat adjacent the outlet side since heat has been absorbed from the air by the frozen food. As a result, if the air continues to flow only in one direction, cool air may be trapped within the chamber 14 adjacent the outlet side thereof and the food at the right would not be heated at a uniform rate with food at the left.

In accordance with the present invention, wherein the air flow is periodically reversed, the creation of pockets of cool air in the chamber is avoided. Thus, for example, if the air initially flows from left to right within cavity 14, as seen in FIG. 2, any pockets of cool air at the right in cavity 14 would be swept or flushed from the cavity when the air flow direction is reversed. That is, once the direction of air flow has changed from right to left in cavity 14, as seen in FIG. 2, any cool air pockets at the right of the cavity will be displaced by the heated air entering through wall 70. This feature of the invention insures relatively uniform heating of the frozen food product.

The turbulence in the air adjacent the outlet side of cavity 14 also is beneficial during the reversal of the air flow because when the direction of air flow is reversed, the jets of air from the inlet side of cavity 14 encounter the turbulent air remaining at the end of the preceding air supply cycle. This turbulence, in conjunction with the jets of laminar flow air, aids in the removal of pockets of cold air remaining adjacent the inlet side of the cavity.

In addition, as mentioned above, a greater heat transfer between the heated air and the frozen food product will occur adjacent the inlet side for the air flow into cavity 14 than will occur adjacent the outlet side of cavity 14. This result is due to the fact that the air moves relatively rapidly in cavity 14 adjacent the inlet side, but increases in turbulence and reduces its speed, adjacent the outlet side. This phenomenon allows the food adjacent the outlet side of the cavity at each cycle of motor 36 to temper and permit the heat absorbed by its exterior surfaces to move inwardly to the center of the food product, without the application of additional heat to the exterior surfaces of the food or its container. Accordingly, the food on each side of the chamber 14 is allowed to temper alternately, depending upon the direction of air flow in the cavity. In addition, the direction of air flow insures that the food is uniformly heated on both sides of the cavity since the heating process is, in effect, an impulse heating process wherein the food on opposite sides of cavity 14 is alternately provided with impulses of greater and lesser heat.

By the construction of the oven 10 of the present invention and the method of operation thereof, frozen food products can be rapidly and uniformly reconstituted to a temperature at which they are ready to serve. The food products may be wrapped or unwrapped, but it has been found that the method of the present invention is particularly adapted to reconstitute packaged frozen food products without the necessity of unpacking the food. As mentioned, the periodic reversals of the air flow can take place within a range of 3 to 7½ minutes, with the lower time period of 3 minutes being preferred for baked products so that a more uniform baking temperature is maintained within the products at all times.

The impulse heating phenomenon of the present invention is also enhanced by the operation of the electronic controls for the heaters, wherein the temperature of the air is allowed to fluctuate between the desired maximum temperature and a temperature which is somewhat lower than the maximum. As a result, during the periods in which the heaters 38 are shut off, the heat previously supplied to the food products during the high temperature cycle will be permitted to pass inwardly of the food. Of course, it will further be appreciated that the food products at the center of the trays or rack 18 within cavity 14 will be uniformly heated throughout the various operating cycles of the oven.

Accordingly, it is seen that a relatively simple and inexpensively operable process for reconstituting frozen food is provided which assures uniformity of heating of the various food products.

Although an illustrative embodiment of the present invention has been described herein with reference to the accompanying drawing, it is to be understood that the invention is not limited to that precise embodiment, and that various changes and modifications may be effected therein by one skilled in the art without departing from the scope or spirit of this invention.

What is claimed is:

1. The method of reconstituting frozen food to a ready to serve state which comprises the steps of, delivering heat to the food at an average rate which is in excess of the rate at which heat will pass into the food, by supplying heated air to the food at a controlled varying temperature and in a predetermined direction; periodically reversing the direction of air flow at predetermined intervals; and varying the temperature of said heated air between a maximum temperature for the food being treated and a lower temperature by cyclically raising the temperature of the heated air to said maximum temperature, allowing the temperature to drop to said lower temperature and then raising the temperature again while the air is continuously supplied to the food and its flow direction is periodically reversed.

2. The method as defined in claim 1 wherein said food is in an oven cavity having a pair of opposed perforated walls and said heated air is supplied and discharged in a substantially laminar stream to the cavity through said perforated walls.

3. The method as defined in claim 1 wherein the step of varying the temperature of said air between said maximum temperature and said lower temperature includes the step of allowing the temperature to drop from said maximum temperature on the order of 25°F to said lower temperature.

4. The method as defined in claim 1 wherein said predetermined intervals are between 3 and 7½ minutes in length.

5. The method as defined in claim 1 including the step of deflecting said heated air to flow laterally across the food.

6. The method of reconstituting frozen food to a ready to serve state in an oven having a heating cavity defined between a pair of opposed air supply chambers having perforated walls respectively located on opposite sides of said cavity, said oven including an air plenum chamber outside said cavity and communicating with said air supply chambers thereby to define a recirculating path of travel for air between said chambers through said cavity, said method comprising the steps of placing said food in said cavity in vertically spaced layers whereby air moving laterally through the heating cavity between said perforated walls passes uniformly between said layers; delivering heat to the food in said cavity at an average rate which is in excess of the rate at which heat will pass into the food, by continuously recirculating heated air through said cavity along said flow path and between said perforated walls; periodically reversing the direction of said air flow along said flow path at predetermined intervals of between 3 and 7½ minutes in duration; maintaining the temperature of said heated air within a predetermined range by cyclically increasing the temperature of said heated air to a maximum temperature selected according to the food being treated and allowing the temperature of the air to drop to a lower temperature on the order of 25°F lower than said maximum temperature to allow heat on the surface of the food to pass inwardly thereof, while the air is continuously supplied to the food and its flow direction is periodically reversed.

7. The method as defined in claim 6 including the step of deflecting said heated air in said air supply chambers to flow laterally across food in said cavity from one perforated wall to the other.

8. The method as defined in claim 7 including the step of reducing the speed of air flow on the discharge side of said cavity whereby the food on the inlet side of the cavity with respect to the instantaneous direction of air flow is heated at a faster rate than food adjacent the discharge side thereof.

* * * * *